United States Patent [19]

Ostapchenko et al.

[11] 4,042,657
[45] Aug. 16, 1977

[54] PROCESS FOR THE AUTOMATIC INSPECTION OF BLOW-MOLDED ARTICLES

[75] Inventors: George Joseph Ostapchenko, Wilmington, Del.; Terrance Duane Phillips, Aiken, S.C.

[73] Assignee: E. I. Du Pont De Nemours and Company, Wilmington, Del.

[21] Appl. No.: 659,934

[22] Filed: Feb. 20, 1976

[51] Int. Cl.² .................................................. B29C 17/07
[52] U.S. Cl. ................................... 264/40.1; 264/89; 264/97; 425/DIG. 231
[58] Field of Search ................. 264/40.1, 40.3, 40.5, 264/89, 94, 96, 97, 98, 99, 328; 425/139, 149, DIG. 231

[56] References Cited

U.S. PATENT DOCUMENTS

| | | |
|---|---|---|
| 3,012,286 | 12/1961 | Gasmire .................................. 264/97 |
| 3,137,748 | 6/1964 | Makowski .............................. 264/97 |
| 3,255,716 | 6/1966 | Knoechel et al. .............. 264/40.5 X |
| 3,337,666 | 8/1967 | Wilkins .................................. 264/97 |
| 3,412,187 | 11/1968 | Fogelberg et al. ..................... 264/89 |
| 3,433,862 | 3/1969 | Weber .................................... 264/97 |
| 3,492,106 | 1/1970 | Peters et al. ............................... 65/82 |
| 3,577,291 | 5/1971 | Uchida ............................... 264/94 X |
| 3,635,632 | 1/1972 | Shaw et al. ........................... 425/297 |
| 3,640,667 | 2/1972 | Rupert et al. ..................... 425/326 R |

FOREIGN PATENT DOCUMENTS 1,267,430  3/1972  United Kingdom

Primary Examiner—Jan H. Silbaugh

[57] ABSTRACT

Blow-molded thermoplastic articles such as bottles are produced from preforms while measuring the pressure in the article and comparing the measured pressure with standard values. Articles having measured pressure values which deviate from standard are rejected.

6 Claims, 3 Drawing Figures

PROCESS FOR THE AUTOMATIC INSPECTION OF BLOW-MOLDED ARTICLES

BACKGROUND OF THE INVENTION

This invention relates to blow molding and, more particularly, relates to an improved method for blow molding thermoplastic articles, such as bottles, in which the blow molding fluid pressure is monitored as an inspection tool.

Thermoplastic bottles are replacing glass containers in applications where breakage resistance is an important factor. For instance, thermoplastic bottles are now widely used for packaging household products, and certain polymers, such as poly(ethylene terephthalate), hereinafter PET, are being proposed for use in carbonated soft drink containers.

Thermoplastic bottles can be commercially manufactured by inflating a hollow preform against a mold cavity employing either injection blow molding or reheat blow molding techniques. The quantity of polymer per bottle can be minimized, for most polymers, by conducting the process at the appropriate temperature to impart orientation in the bottle sidewall, thereby improving bottle strength. Mechanical stretching is often employed, either concurrent with or prior to the inflation step, to obtain optimum orientation.

The behavior of thermoplastic materials, during inflation, is sensitive to variations in blow-molding pressure and preform temperature, geometry, and molecular weight. Unless these variables are within prescribed limits, the resulting bottle will be defective. For instance, an improperly inflated PET bottle may have a milky-white appearance due to polymer crystallization, unacceptable wall thickness variations, and in extreme situations, folds or holes in the bottle walls.

Although conventional process controls minimize the production of defective bottles, it remains necessary to inspect the bottles because so many variables influence the process and process controls are not fail-safe. An automatic method for inspecting the bottle is especially desired to minimize the number of inspectors, to abort defective bottles prior to any subsequent manufacturing operation, and to provide an early alert if the process is not operating properly.

Polymer viscosity, preform configuration and temperature, and blow molding pressure all influence a blow molding operation and are selected to cause a thermoplastic preform to expand in a predetermined manner during inflation.

When making a biaxially oriented bottle, for instance, a preform temperature and/or geometry profile can be employed to progressively initiate inflation in the neck, sidewall, and base regions of the preform. Blowing pressures are employed which do not force the expanding preform into contact with the chilled mold until the desired level of orientation is reached since earlier contact will set the polymer, making further stretching difficult, if not impossible, without damage to the bottle walls. This procedure places additional polymer in the bottle base, which is less oriented than the bottle sidewall, thereby achieving desired, over-all strength with a minimum of polymer.

SUMMARY OF THE INVENTION

It has now been found that behavior of the preform can be ascertained from pressure-time measurements made during preform inflation and that the history can be used to detect off-standard blow-molded articles. Accordingly, this invention provides, in a blow molding process wherein a heated thermoplastic preform is placed in a mold and is then inflated against the mold under pressure to form a hollow thermoplastic article, the improvement wherein the hollow thermoplastic article is produced while a. measuring fluid pressure variations in the preform as it is inflated, b. comparing the measured fluid pressure variations with a standard pressure trace representative of commercial quality, hollow thermoplastic articles, and c. rejecting hollow thermoplastic articles having fluid pressure measurements which deviate from the standard pressure trace. By "standard pressure trace" is meant the pressure-time history of commercial quality, hollow thermoplastic articles during inflation. The standard pressure trace includes a narrow range of acceptable pressures in the preform at any instant during inflation, the limits of which depend on the particular process conditions selected for manufacture.

This inspection process is not restricted to any particular thermoplastic material but can be used to special advantage in the manufacture of biaxially oriented thermoplastic articles by injection blow molding or reheat blow molding where behavior of the preform is critical during inflation. Thus, the invention has particular utility in a process for the manufacture of bottles from a substantially amorphous, injection-molded PET preform and it will be further described with respect thereto.

DESCRIPTION OF THE PREFERRED EMBODIMENTS

A typical PET bottle preform has a prefinished neck, a closed bottom, and tapered sidewalls which increase in thickness and/or increase in outside diameter from the neck to the bottom. The tapered geometry causes inflation to be initiated in the wall area adjacent the prefinished neck, producing a bottle having uniformly thick sidewalls and a relatively thick base. Injection molding techniques are conveniently employed to make preforms having this design.

Prior to inflation, the preform is heated to its orientation temperature of 80° to 110° C, preferably about 88° to 95° C. Hotter portions of the preform tend to draw to a greater degree and differential heating can be employed, if desired, to provide a preform temperature profile which aids in obtaining the desired distribution of polymer in the bottle. Temperature profiling may complement, or be a substitute for, use of tapered preform geometry.

Figure 1:
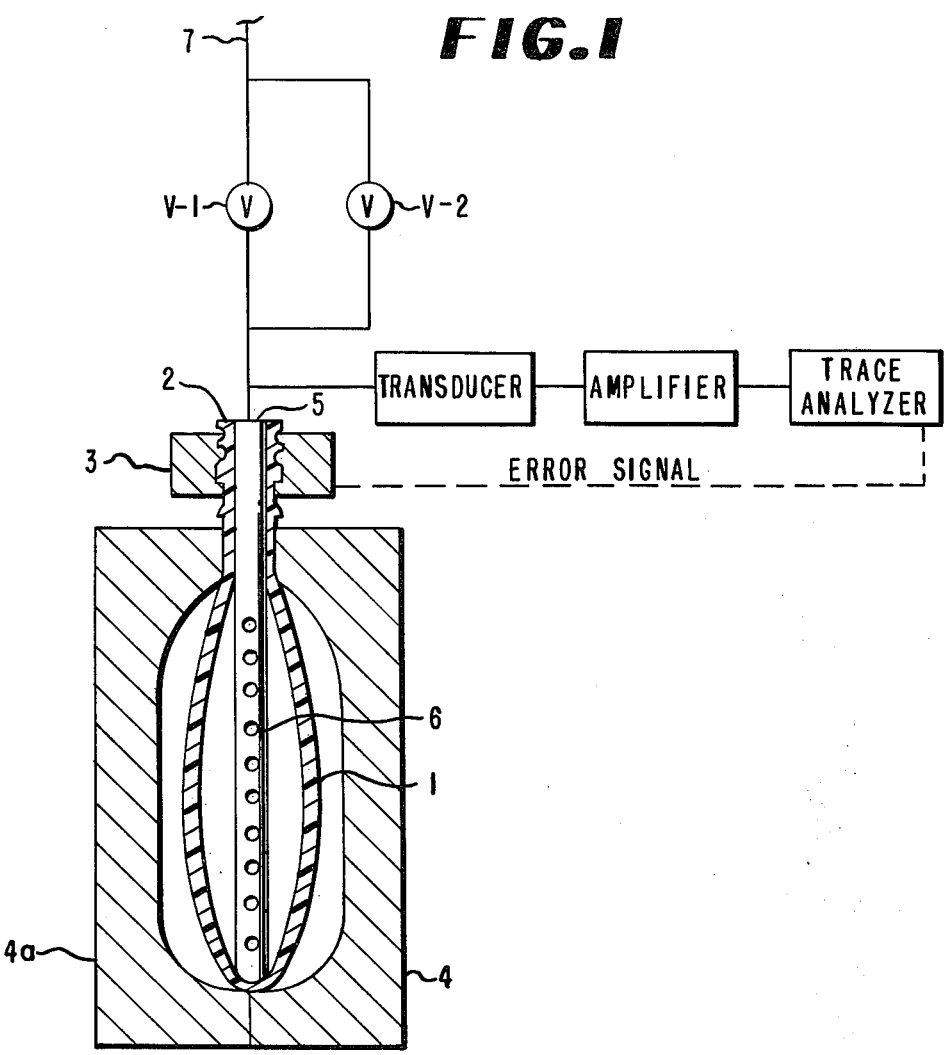
FIG. 1 is a schematic drawing illustrating apparatus which can be used in practicing the invention.

Referring now to the drawings, FIG. 1 shows a partially inflated preform 1 having a prefinished neck 2 releasably engaged by clamp 3 which holds the preform in registered position between mold halves 4 and 4a during the blow molding process. A hollow extensible mandrel 5 having a plurality of holes 6 serves both as a stretching rod and as the instrument for providing blowing fluid to the preform.

As the blow molding cycle begins, the mandrel, which has been held in a retracted position, is inserted into the preform and extended to stretch the preform in the axial direction, imparting axial orientation. A blowing fluid, typically plant pressurized air, is simultaneously fed to the preform from line 7 through solenoid-actuated reducing valve V-1. The reduced air typically increases from 0 to about 100 to 120 psig pressure is about 0.25 second as the mandrel is being extended, partially inflating the preform.

When the mandrel has been fully extended, as shown in FIG. 1, it pins the preform to the mold, thereby aligning the partially inflated preform in the mold cavity to prevent manufacture of an off-center bottle. Solenoid-actuated valve V-2 is then opened to increase the air pressure, typically to 400 to 600 psig, to complete expansion of the preform and gain excellent mold replication. After the bottle has been found, typically within 1 to 2 seconds after the cycle was begun, the air is exhausted, the mold halves are opened, and the mandrel is withdrawn to its retracted position. The bottle is then discharged from the clamp for conveying to subsequent manufacuring steps, such as washing, and shipping.

A pressure Transducer (e.g., a Model PT310B-IM, manufactured by Dynisco with an operating range of 0-1000 psig) is mounted in the air supply line after the reducing valves about 30 inches from the place where the air enters the preform, to measure pressure variations in the preform during the blow-molding cycle. The transducer signal level is 0.035 MV/psi. The critical area of signal measurement occurs during the first 0.5 second of blowing. Air pressure measure within this period begins at zero and hits an initial (normal 100 psi) peak at about 0.25 second and then begins to drop. The pressure drop is caused by the expansion rate of the preform exceeding th e make-up rate of the air supply. For a normal bottle, the pressure drop is about 20% of the initial peak pressure. The lower pressure at the dip, nominally 80 psi, occurs at about 0.35 second. The Transducer signal level voltages involved are about 3 MV at the peak and 2.4 MV at the dip. The pressure versus time can be plotted as a trace on a suitable recorder (e.g., a Model 770GB Thermal Recording System manufactured by Hewlett Packard Co.). The transducer signal is fed to an Amplifier (e.g., Analog Devices Model 40J op amp) and then to a Trace Analyzer which compares the measured pressure variations with a standard pressure trace representative of that generated by commercial quality bottles. An error signal is generated if the pressure measurements do not fall within prescribed limits. The error signal either causes the clamp to prematurely release the bottle, deverting it into a reject chute as the bottle is removed from the mold cavity, or actuates a device in the assembly line to discharge the defective bottle.

Figure 2:
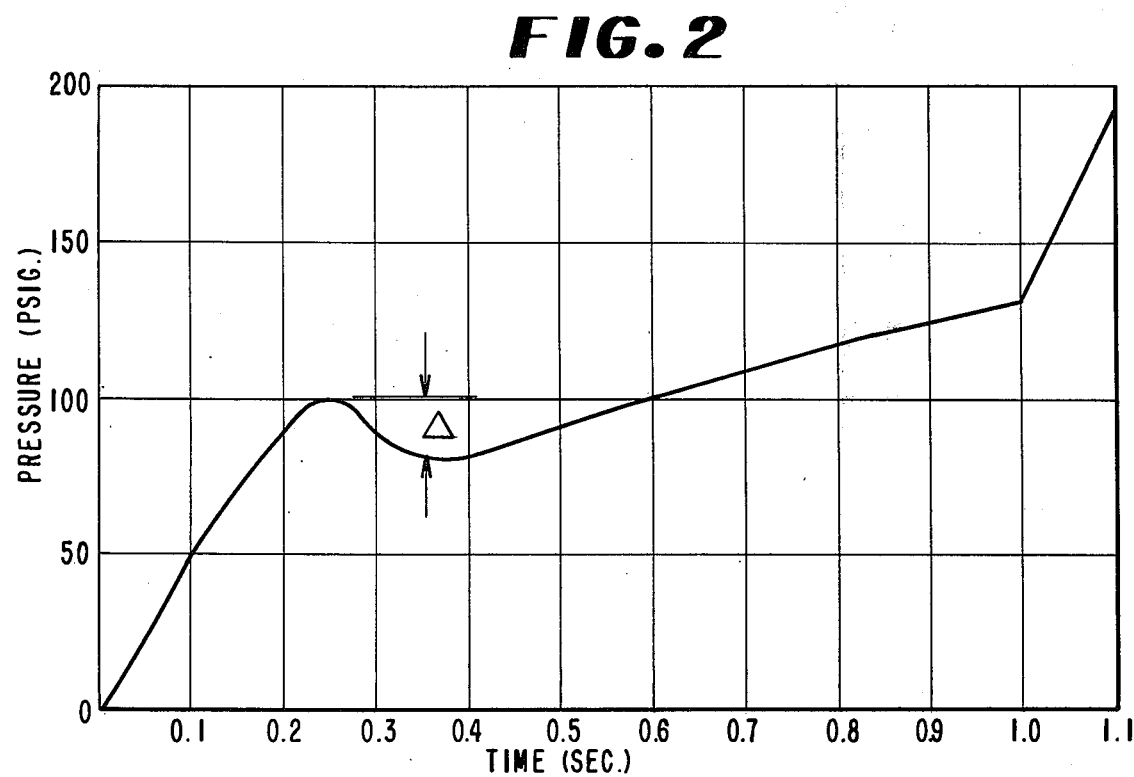
FIG. 2 is a typical standard pressure trace generated during inflation of a PET bottle preform using the apparatus of FIG. 1.

FIG. 2 illustrates the pressure-time history of a typical PET preform during the critical early portion of the blow-molding cycle which influences bottle properties; i.e., FIG. 2 is a standard pressure trace.

At time 0, pressure valve V-1 was opened and the mandrel was extended, causing a rapid pressure buildup with only slight preform expansion. When the pressure reached the yield point of the preform, about 0.25 second later, the neck region of the preform began to inflate, resulting in a pressure drop in the preform. The pressure continued to drop until the mandrel was fully extended, about 0.35 second after valve V-1 was opened. The pressure then increased, relatively slowly, as inflation of the preform continued. At 1.0 second after valve V-1 was opened, valve V-2 was opened to increase pressure in the preform, thereby forcing the preform into intimate contact with the chilled mold to obtain excellent mold replication and a short quench time. Then the air was exhausted, the mold was opened, and the bottle was removed.

Defective bottles behave differently during inflation and can be detected by comparing their pressure-time history with a standard pressure trace, such as that of FIG. 2. In general, the bottle sidewall may be too thin, have folds, or be pearlescent if the initial inflation occurs too rapidly, as evidenced by an unduly slow buildup of pressure. Pearlescence may be defined as opacity caused by voids generated at too low a temperature or by overstretching at the proper temperature. Conversely, the bottle may have unacceptable deviations in wall thickness if the initial inflation occurs too slowly, as evidenced by unduly rapid buildup of pressure.

More specifically, a preform which is too cool when inflated will result in a pearlescent bottle which is readily detected by its high peak pressure as it starts to inflate, its late dip in pressure, and a large magnitude between the peak and dip. If the preform is too hot, the resulting hazy bottle is detected by its low peak pressure at the start of inflation, a rapid pressure dip, and a low magnitude between the peak and dip.

Comparison with the standard pressure trace also detects bottles which are defective due to fluctuations in the line blowing pressure. If the blowing pressure is too high, for instance, the resulting pearlescent bottle is detected by its high peak pressure as it starts to inflate, by a rapid dip, and by a low magnitude between the peak and dip. A bottle having wall folds, caused by low blowing pressure, is detected by its low peak pressure at the start of inflation and by a large magnitude between the peak and dip. Similar deviations from the standard pressure trace occur if the mandrel is not properly extended, resulting in too little or too much axial orientation.

Alternatively, the amplitude of the pressure drop which occurs as the preform starts to inflate, shown as $\Delta$ in FIG. 2, can be used to indicate performance of the preform during inflation. Comparison of the measured pressure drop with that of a standard pressure trace is slightly less reliable than comparison of values over the entire pressure trace, but can be accomplished with less expensive equipment. This technique, however, reliably detects bottles which are defective due to improper preform temperature or blowing pressure, the most usual causes of bottle defects.

Figure 3:
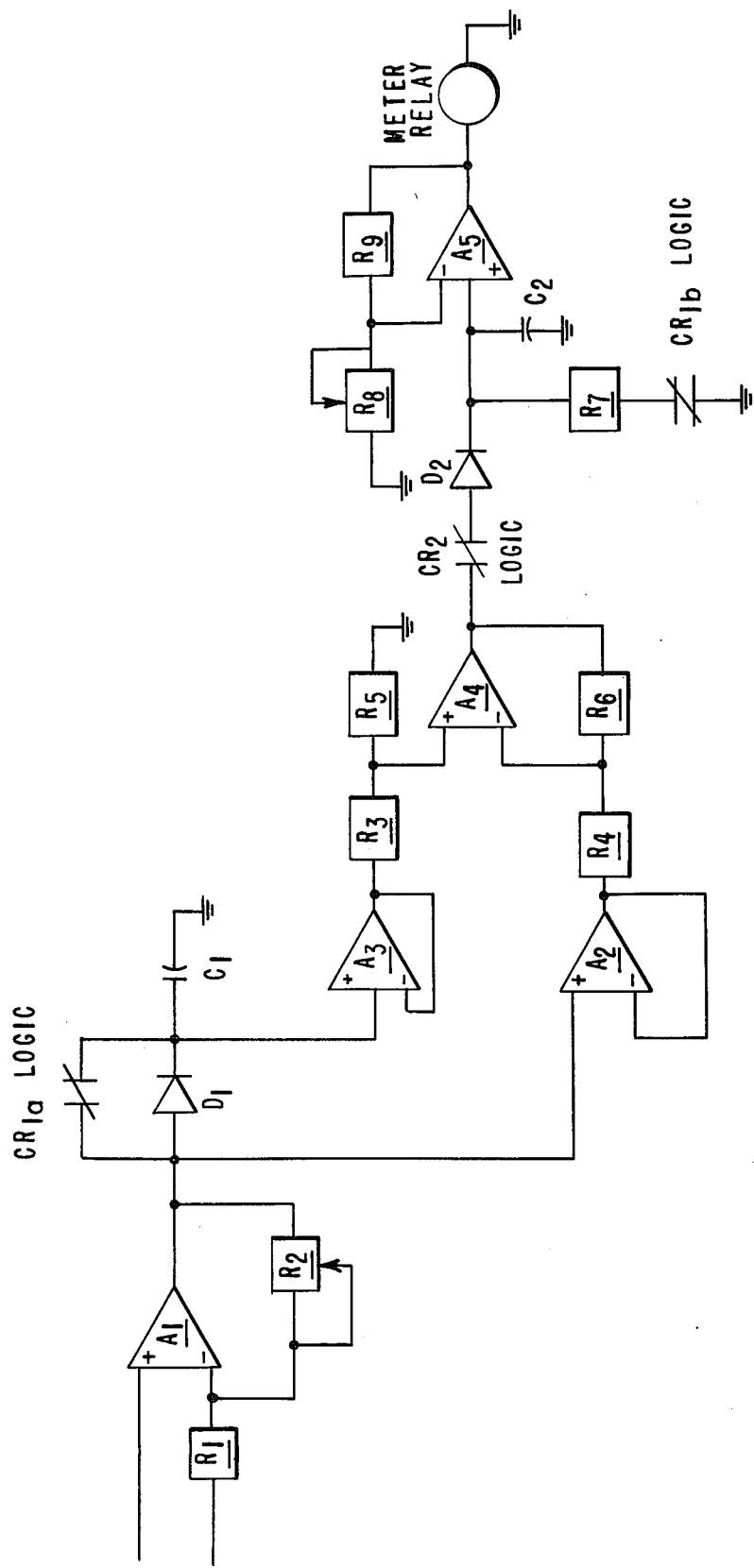
FIG. 3 is a schematic circuit diagram of the electronic components in a blow trace analyzer.

A suitable trace analyzer can be designed as follows: Two 5-volt DC power supplies are tied in series to develop a plus 10 volt to ground supply for the transducer probe. Each probe requires a maximum of 30 MA. The system can be designed to drive four transducer probes simultaneously. The 120-MA full load is easily handles by a 500-MA power supply (Analog Devices Model 903). It is important that the negative side of the supply be grounded to a solid "building" ground. Referring now to FIG. 3, a first-stage amplifier $A_1$ amplifies the Transducer output in a noninverting mode. This and all amplifiers to be described are of the model 40J type described hereinabove. The first-stage gain is approximately 2,000 to 1 with the output being about 8 volts. The trimming of $A_1$ is very important and must be set so that $A_1$ output is slightly positive prior to blowing. If the $A_1$ output drifts negative, stage $A_4$ will register an output prematurely. $R_1$ is a 1 K ohm resistor, and $R_2$ is a 1 meg ohm resistor (plus a 1 meg pot). It is convenient to record the primary air portion of the blow trace at the output of $A_1$. If the impedance of the recorder is significantly below 2 meg ohm to ground, the gain of the first stage may be affected, and a separate follower mode interfacing amplifier is recommened between $A_1$ and the recorder.

As the Transducer signal increases toward the initial pressure peak, the positive-going voltage charges the capacitor $C_1$, the contact $R_1$ being open. As the pressure falls from the peak, the capacitor holds at the maximum voltage because there is no discharge path. Amplifier $A_3$ presents a 10 inch ohm input impedance and the diode $D_1$ will not conduct back to the less positive output of $A_1$. As the peak is passed and the $A_1$ output voltage is becoming less negative, a difference is generated between the positive and negative inputs of amplifier $A_4$. $R_3$–$R_6$ are all 220 K ohm resistors. The output of $A_3$ is held constant at the peak, and the output of $A_2$ drops from the peak as it follows the output of $A_1$. Stage $A_4$ is a "subtractor." Its output, equal to the difference between the peak and the dip, is a positive voltage; therefore, capacitor $C_2$ is charged through diode $D_2$ to the maximum difference value and cannot discharge as the blow pressure begins increasing again following the dip. $R_7$ is a 10 K ohm resistor. Stage $A_5$ serves two functions. Principally, its serves as a high impedance output amplifier to sample and hold the different signal. Secondly, it provides a 10 to 1 gain with which the establish a midrange operating point for the meter relay. $R_8$ is a 1 meg ohm (plus 1 meg pot) resistor and $R_9$ is a 1 meg ohm resistor. Relay contact $CR_2$ opens at a nominal 0.5 second to prevent drift in the output stage. The meter relay is a General Electric Double Setpoint Type 195, 0-15 volt DC. The output of $A_5$ is established after about 0.35 second. Since the meter movement is considerably slower than the electronics, it is not interrogated until 1.0 to 1.5 seconds. If the meter registers above or below the high and low set points, respectively, the bottle is deemed unacceptable. A Reed relay logic system utilizes the meter relay to divert unacceptable bottles off the production line. When the blowing operation is complete, the relay contacts $CR_1$, $CR_{1b}$, and $CR_2$ close to discharge the capacitors and ready the system for the next cycle. In the foregoing description and drawing, $CR_1$ and $CR_2$ are normally closed relay contacts operated by the logic circuit, and $C_1$ and $C_2$ are 0.22 $\mu f$ (15 wvdc) Sprague capacitors.

We claim:

1. In a blow-molding process wherein a heated thermoplastic preform having a prefinished neck, sidewall, and closed bottom is (1) placed in a mold, (2) is axially stretched by an inserted mandrel while partially inflating the preform, and (3) is then completely inflated against the mold under increased pressure to form a hollow thermoplastic article, the improvement wherein the hollow thermoplastic article is produced while
   a. measuring fluid pressure variations in the preform as it is inflated,
   b. comparing the measured fluid pressure variations with a standard pressure trace representative of commercial quality, hollow thermoplastic articles, and
   c. rejecting hollow thermoplastic articles having fluid pressure measurements which deviate substantially from the standard pressure trace.

2. The process of claim 1 wherein the fluid pressure is continuously measured and compared with the standard pressure trace.

3. The process of claim 1 wherein the fluid pressure is intermittently measured and compared with the standard pressure trace.

4. The process of claim 1 wherein the measured fluid pressure drop, which occurs as the preform starts to inflate, is compared with the pressure drop of the standard pressure trace.

5. The process of claim 4 used to detect defective poly(ethylene terephthalate) bottles.

6. The process of claim 1 wherein the inflation of said preform is initiated progressively in the neck, sidewall and trace regions of the preform.

* * * * *